United States Patent [19]
Meckstroth et al.

[11] Patent Number: 5,531,648
[45] Date of Patent: Jul. 2, 1996

[54] ACCESSORY DRIVE SYSTEM FOR AN AUTOMOTIVE ENGINE

[75] Inventors: Richard J. Meckstroth, Northville; Gerard S. Toth, Belleville, both of Mich.

[73] Assignee: Ford Motor Company, Dearborn, Mich.

[21] Appl. No.: 437,103

[22] Filed: May 5, 1995

Related U.S. Application Data

[63] Continuation-in-part of Ser. No. 223,250, Apr. 4, 1994, Pat. No. 5,439,420.

[51] Int. Cl.$^6$ ............................................. F16H 7/08
[52] U.S. Cl. ............................................. 474/110; 474/136
[58] Field of Search ......................... 474/101, 109–111, 474/113, 117, 133–138

[56] References Cited

U.S. PATENT DOCUMENTS

| | | |
|---|---|---|
| 1,701,820 | 2/1929 | Morse . |
| 3,136,170 | 6/1964 | Murray . |
| 4,761,155 | 8/1988 | Kinoshita et al. ............ 474/110 |
| 5,131,889 | 7/1992 | Meckstroth et al. . |
| 5,256,113 | 10/1993 | Bushman et al. . |
| 5,304,099 | 4/1994 | Deppe et al. ............ 474/110 |

FOREIGN PATENT DOCUMENTS

| | | |
|---|---|---|
| 279415 | 11/1951 | France . |
| 0229152 | 9/1989 | Japan ............ 474/110 |

*Primary Examiner*—Michael Powell Buiz
*Attorney, Agent, or Firm*—Jerome R. Drouillard; Roger L. May

[57] ABSTRACT

An accessory drive system for an automotive engine includes a drive pulley attached to an output shaft of the engine and a flexible drivebelt for connecting the drive pulley with driven pulleys. A tensioner maintains the drivebelt in contact with each of the drive and driven pulleys. The tensioner includes an arm which is rotatably mounted to the engine which has a wheel for contacting the drivebelt. Motion of the arm is controllably damped by a spool valve which controls the flow of hydraulic fluid in a hydrostatically lockable hydraulic cylinder incorporated in the tensioner.

8 Claims, 4 Drawing Sheets

ACCESSORY DRIVE SYSTEM FOR AN AUTOMOTIVE ENGINE

This is a continuation-in-part of U.S. Ser. No. 08/223,250 filed Apr. 4, 1994 now U.S. Pat. No. 5,439,420.

BACKGROUND OF THE INVENTION

The present invention relates to a belt-driven automotive engine accessory drive system and means for tensioning such a system. Drive systems for the front end accessories of automotive engines typically include a belt having a tensioning device for maintaining the belt in contact with all the pulleys of the system, including the drive pulley, which is usually attached to the crankshaft of the engine, as well as with a plurality of driven pulleys, with at least one driven pulley attached to each rotating accessory. Such accessories frequently include an alternator, a power steering pump, an air conditioning compressor, a secondary air pump for emission controls, as well as other types of rotating devices.

Conventional tensioners utilize elastic force provided by, for example, a flat wire spring for maintaining a tensioning pulley in contact with the drive belt. Such a pulley is shown as item No. 34 in FIG. 1 of the present application. Although damped tensioners have been used to some extent in automotive front end accessory drive systems, such tensioners typically are symmetrical in their damping characteristics. In other words, motion of the tensioner is damped both in the direction toward the belt and away from the belt. Unfortunately, if the tensioner is set up with a fairly low damping rate so as to allow the tensioner wheel to be compliantly in contact with the belt, the tensioner will be allowed to pull away from the belt in the event that the following series of events occurs within the accessory drive system.

FIG. 6 illustrates a problem with conventional tensioners which is solved by a tensioner according to the present invention. Operation of a front end accessory drive system with a corrective tensioner according to the present invention is shown in FIG. 7. Both plots illustrate the rotational speed or angular velocity of an engine's alternator, idler pulley, and crankshaft pulley. The rotational speed of the idler pulley is a direct indicator of the speed of the drivebelt because it is assumed for the purpose of this discussion that minimal slip occurs between the idler pulley and the drivebelt; this is a good assumption because the rotating inertia of the idler pulley is relatively slight as compared with the rotational inertia of the other components of the engine's front end accessory drive system, particularly the alternator. As shown in both plots, crankshaft rpm decreases at a very high rate in the situation being considered. It has been determined that during wide open throttle transmission upshifts at lower gear speeds, such as the upshift from first to second gear with an automatic transmission and an engine speed of, for example 4500 rpm, the crankshaft may decelerate at a rate approaching 20,000 rpm per second. These high deceleration rates cause the front end accessory drivebelt to slip on one or more pulleys, particularly the crankshaft pulley, thereby giving an objectionable squealing noise which will be audible to the driver of the vehicle. The squealing noise produced by the loose drivebelt slipping on the crank pulley is caused by an overrunning effect of the alternator. FIGS. 6 and 7 show rotational speed data produced during tests in which an instrumented engine was rapidly decelerated from a high rate of speed. FIG. 6 illustrates the behavior of a prior art system; FIG. 7 illustrates a system according to the present invention. As shown in FIG. 6, alternator speed tails off to zero at about 300 msec. after the crankshaft stops. Similarly, the idler rpm and drivebelt speed tail off to zero at about 200 milliseconds following the stopping of the crankshaft. This occurs because once the crankshaft stops, the high rotational inertia of the alternator causes it to remain rotating and causes the alternator to pull the tensioner away from the belt. In turn, this causes a "bubble" of belt to extend from the alternator to the crankshaft pulley, and as a result the drivebelt slips on the crankshaft pulley. The resultant squeal may be very audible. In contrast with the operation according to the conventional tensioner at FIG. 6, FIG. 7 shows the results of the use of a tensioner and control system according to the present invention. In essence, the tensioner has a governor for controlling the rotational motion of the tensioner arm such that the tensioner's arm will be freely able to rotate toward the drivebelt, while movement of the arm and tensioner wheel away from the drivebelt is resisted. Because the tensioner cannot move readily in the direction away from the drivebelt, the tension within the belt is maintained and, as a result, the deceleration rates of the drivebelt, the alternator and the crankshaft converge. This is shown graphically in FIG. 7. Note that the three plots for alternator, idler and crankshaft all converge at a about 1100 msec. This means effectively that the alternator is no longer permitted to pull the tensioner away from the belt, and as a result, the alternator is decelerated in close congruence with the crankshaft's deceleration. This has the beneficial effect of preventing squeal of the drivebelt at the crank pulley, because with the tension maintained at a proper level in the drivebelt, the belt will not slip at the crankshaft pulley.

SUMMARY OF THE INVENTION

An accessory drive system for an automotive engine includes a drive pulley attached to an output shaft of the engine, a flexible drivebelt for connecting the drive pulley with a plurality of driven pulleys, with one driven pulley located on each of a plurality of driven devices, and a tensioner for maintaining the drivebelt in contact with each of the drive and driven pulleys. The tensioner comprises an arm which is rotatably mounted to the engine and which has a wheel for contacting the drivebelt, with the wheel being urged into contact with the drivebelt by the arm, and with the tensioner further comprising a hydraulic governor having a sliding valve for hydraulically damping rotational motion of the arm such that at relatively lower rotational speeds of the arm motion of the arm will be damped equally in both directions, but at higher rotational speeds, motion of the arm away from the drive belt will be resisted by a hydrostatic lock within the governor.

According to another aspect of the present invention, the hydraulic governor comprises a hydraulic strut interposed between said tensioner arm and a mounting surface fixed to the engine adjacent the tensioner such that linear motion of the strut accompanies rotational motion of the arm, with the strut including a connecting rod portion having a piston attached thereto, a housing having a cylinder bore, with the piston and connecting rod extending slidably within the cylinder, and a valve body mounted in a valve bore within the housing, with a first passage extending from the compression end of the cylinder to the valve bore, and a second passage extending from the extension end of the housing to the valve bore. A sliding valve is mounted for reciprocal motion within the valve body such that motion of the piston and connecting rod at low velocities are equally damped, but motion of the piston and connecting rod at high speeds is resisted by closure of the passage extending from the compression end of the cylinder to the valve bore. The sliding valve preferably comprises a spool valve mounted within the valve body such that pressure within the first passage will be applied to a piston end of the spool, so as to urge the spool into a position in which flow between the first and second passages is cut off.

The spool valve employed in the preferred embodiment of the present invention includes a generally cylindrical body having an annular groove located on its cylindrical surface, with the annular groove indexing with and allowing fluid communication between ports connected with the first and second passages during lower rotational speeds of the arm, with the spool being urged to a position in which the annular groove is not indexed with said ports whenever pressure applied to the piston end of the spool exceeds a predetermined value, thereby preventing flow between the ports.

DETAILED DESCRIPTION OF THE PREFERRED EMBODIMENTS

Figure 1:
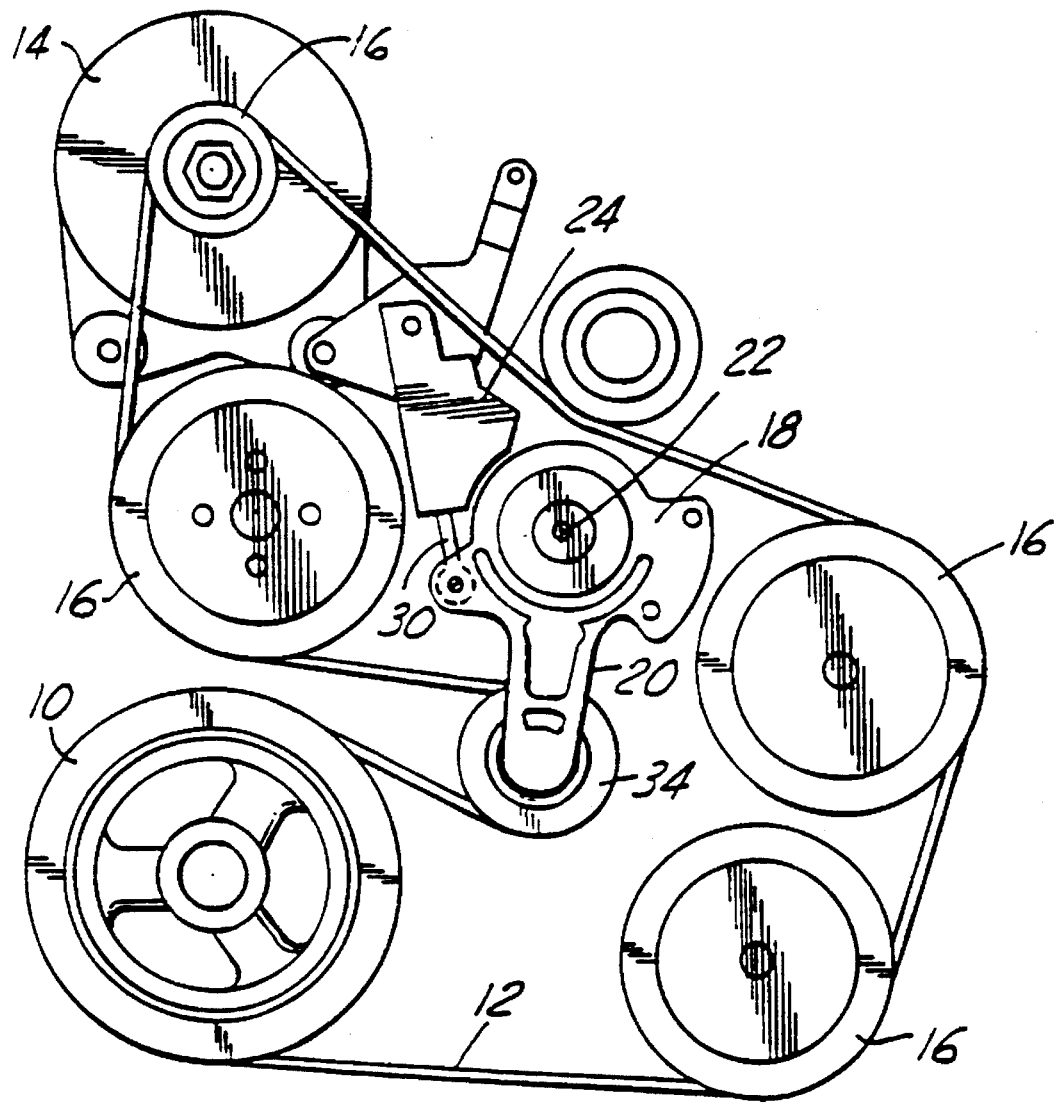
FIG. 1 is a system illustration of a front end accessory drive system according to the present invention.

FIG. 1 illustrates an automotive type internal combustion engine front end accessory drive system according to the present invention. Flexible drivebelt 12, which is driven by pulley 10 attached to the engine's crankshaft, powers a series of rotating accessories which may include an alternator, a power steering pump, an air conditioning compressor, a water pump, an air pump to operate an emission control system, or other rotating accessories known to those skilled in the art. Particularly included in the present combination of accessories is alternator 14 which, due to its high rotational inertia, would normally create a problem which is solved by a tensioner according to the present invention. Tensioner 18, as modified according to the present invention, maintains drivebelt 12 in contact with each of driven pulleys 16, as well as drive pulley 10, so that squealing or other objectionable noises will not occur. This is accomplished by maintaining proper tension in belt 12 at all times.

Figure 2:
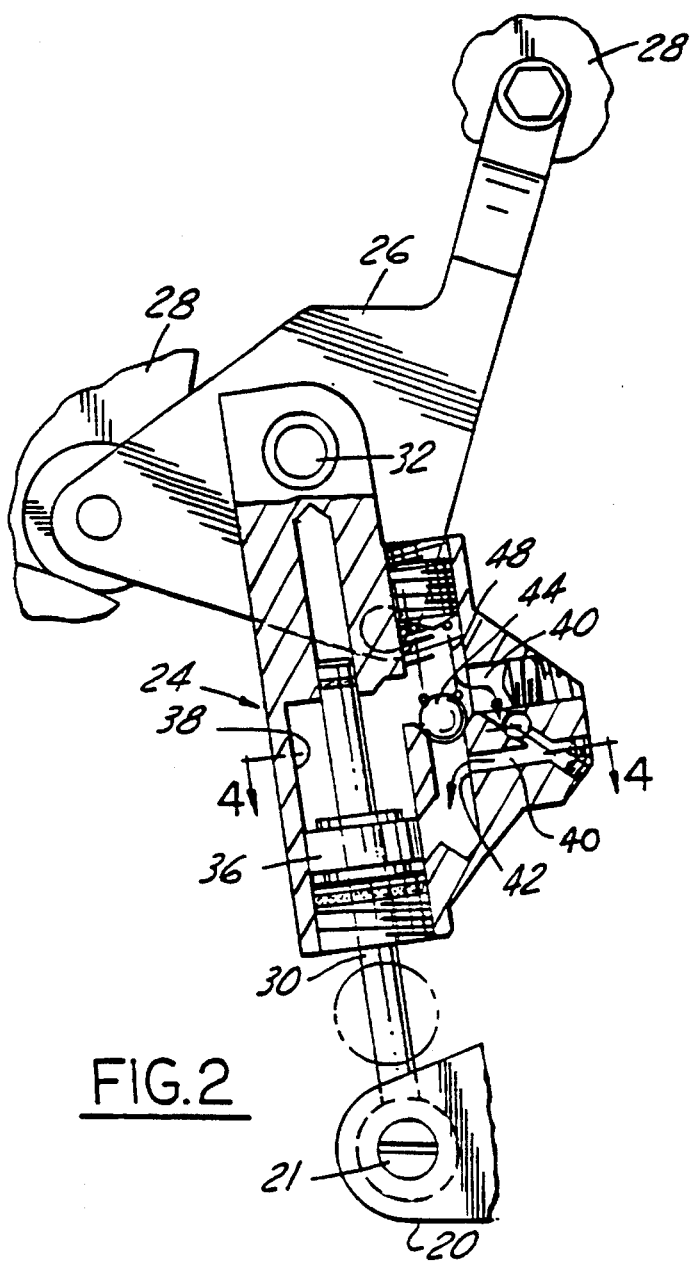
FIG. 2 is a view of a general type of hydraulic strut.
Figure 3:
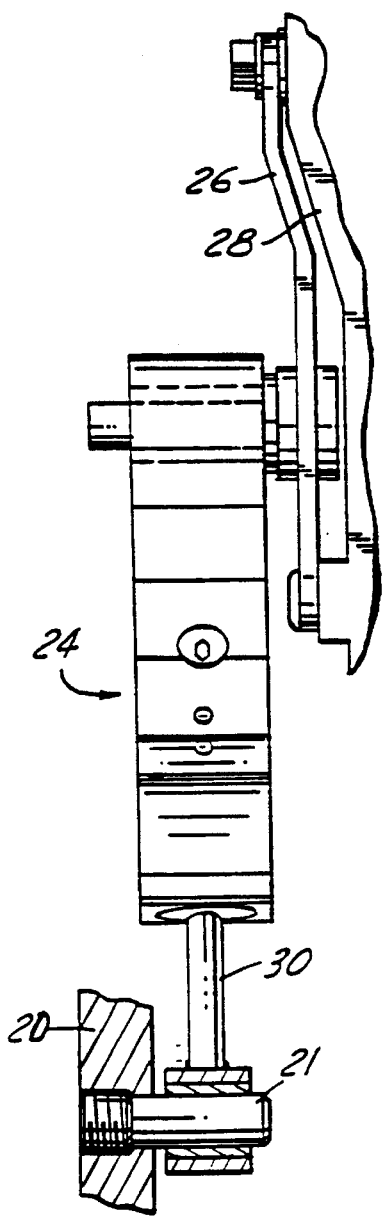
FIG. 3 is a side elevation of the strut illustrated in FIG. 2.

FIGS. 2, and 3 illustrate a general example of a hydraulic strut type of tensioner governor. As shown in FIGS. 2 and 3, strut 24 is attached to bracket 26 which is rigidly mounted to front surface 28 of the engine. Strut 24 is attached to bracket 26 by means of mounting pin 32. The strut has connecting rod 30 having a free end which is pivotally mounted to tensioner arm 20 at pivot point 21. Hydraulic strut 24 also has piston 36 mounted upon connecting rod 30. Piston 36 slides within cylinder bore 38 while following the rotational motion of arm 20. As seen from FIGS. 1 and 2, motion of arm 20 away from drivebelt 12 is accompanied by upward motion of connecting rod 30 toward the mounting end of strut 24 at point 32. Conversely, motion of arm 20 in the direction toward drivebelt 12 is accompanied by motion of connecting rod 30 away from the mounting end of the strut. Motion of connecting rod 30 and piston 36 in a direction in which slack in the drivebelt is decreased, i.e., motion in which piston 36 is moving in the direction in which connecting rod 30 extends to a greater extent from cylinder 38, is substantially uninhibited because hydraulic oil within the cylinder is free to flow through low pressure passage 42, and after unseating check ball 44 from its seat, can freely flow to the upper side of cylinder 38 after having moved past check ball 44. Because check ball 44 is maintained on its seat by spring 48, which can be relatively light, movement of piston 36 and connecting rod 30 in a downward direction so as to accompany increasing tension in belt 12 is relatively uninhibited. If, on the other hand, the engine slows down precipitously so that alternator 14 would tend to pull arm 20 in the direction of decreased tension in belt 12, piston 36 would be forced in an upward direction, and the flow of hydraulic fluid from cylinder 38 would be through port 50 in the top of cylinder 38 and past a metering screw. High pressure passage 40, which allows fluid to flow from the cylinder and past a metering orifice or alternatively, by another type of metering device suggested by this disclosure. Accordingly, motion of piston 36 is essentially restricted by the hydrostatic force built up within cylinder 38. In this fashion, strut 24 will prevent tension on drivebelt 12 from being released due to the overrunning condition caused by alternator 14 or by any other overrunning accessory, for that matter, thereby preventing drivebelt 12 from slipping on any of the drive or driven pulleys.

Figure 4:
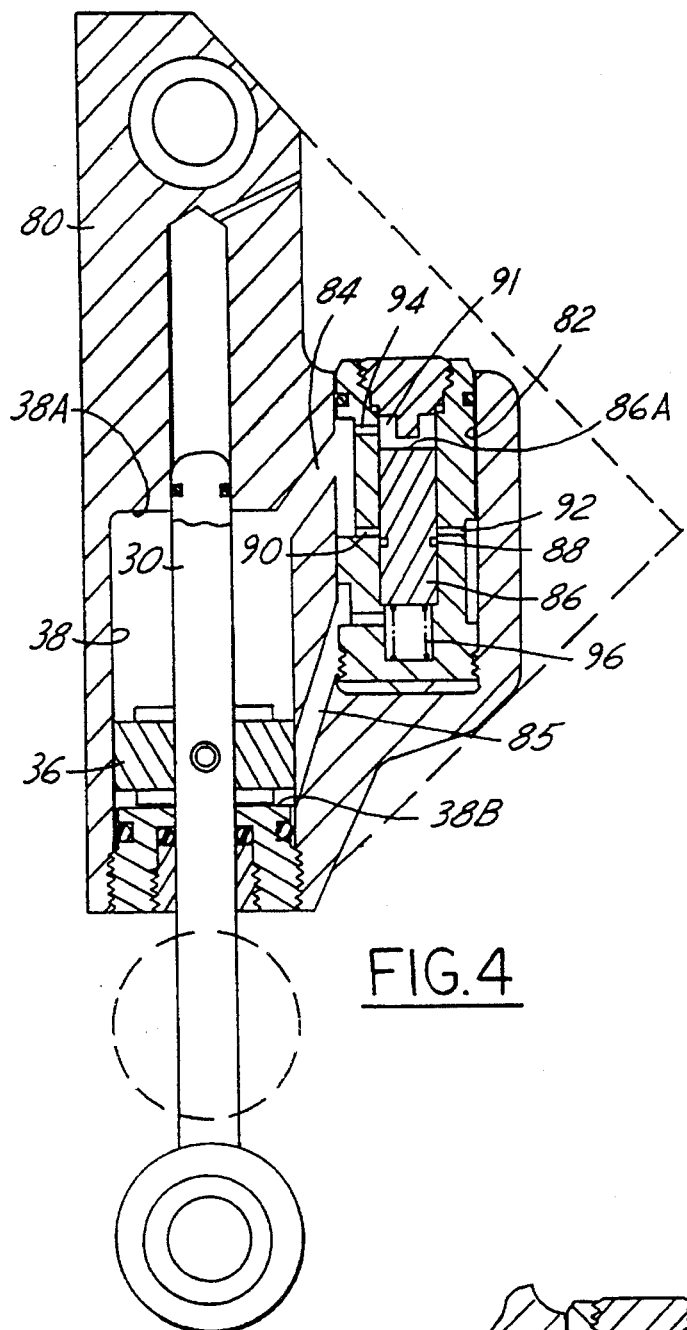
FIG. 4 is a section partially broken away of a first embodiment of a hydraulic strut according to the present invention.
Figure 5:
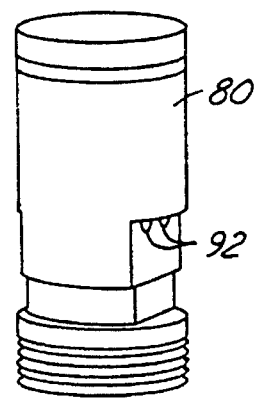
FIG. 5 is an illustration of a valve body used in the embodiment of FIG. 4.
Figure 8:
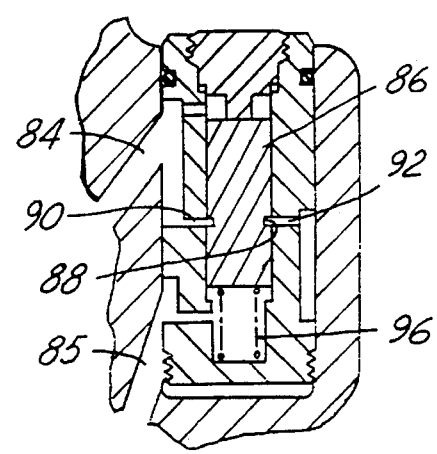
FIG. 8 illustrates a portion of the embodiment of FIG. 4.
Figure 6:
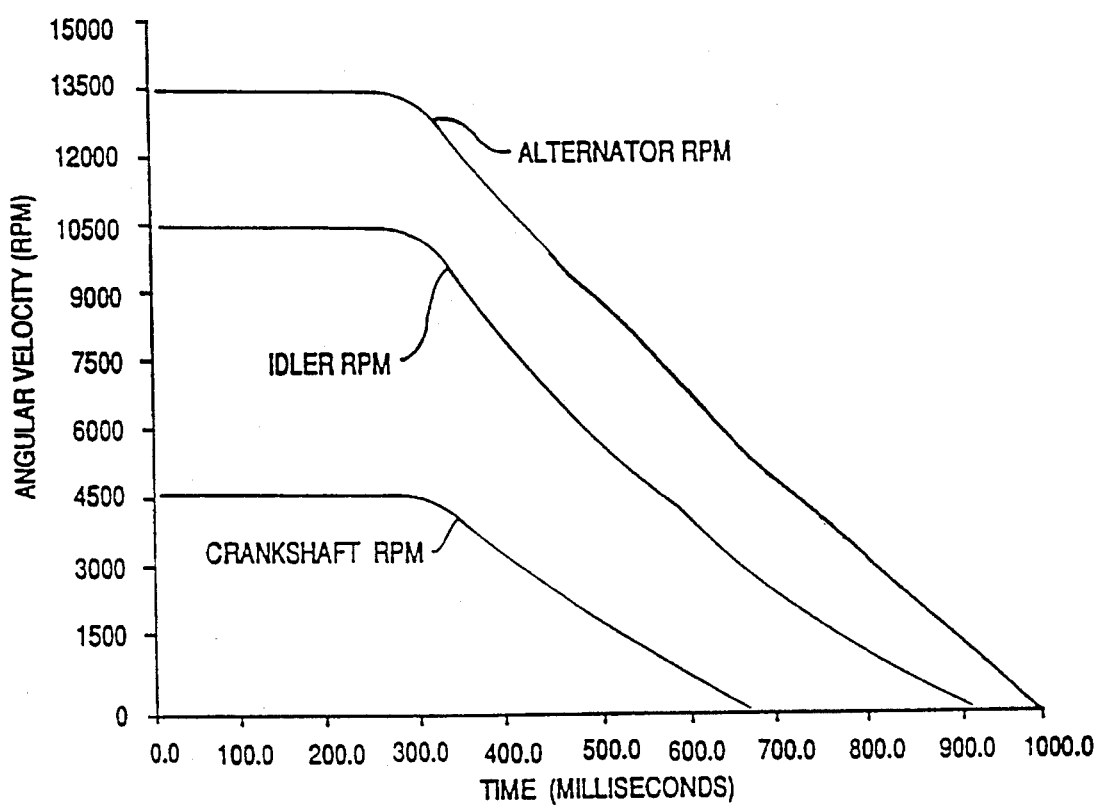
FIGS. 6 and 7 illustrate the operation of a front end accessory drive without and with a system according to the present invention, respectively.
Figure 7:
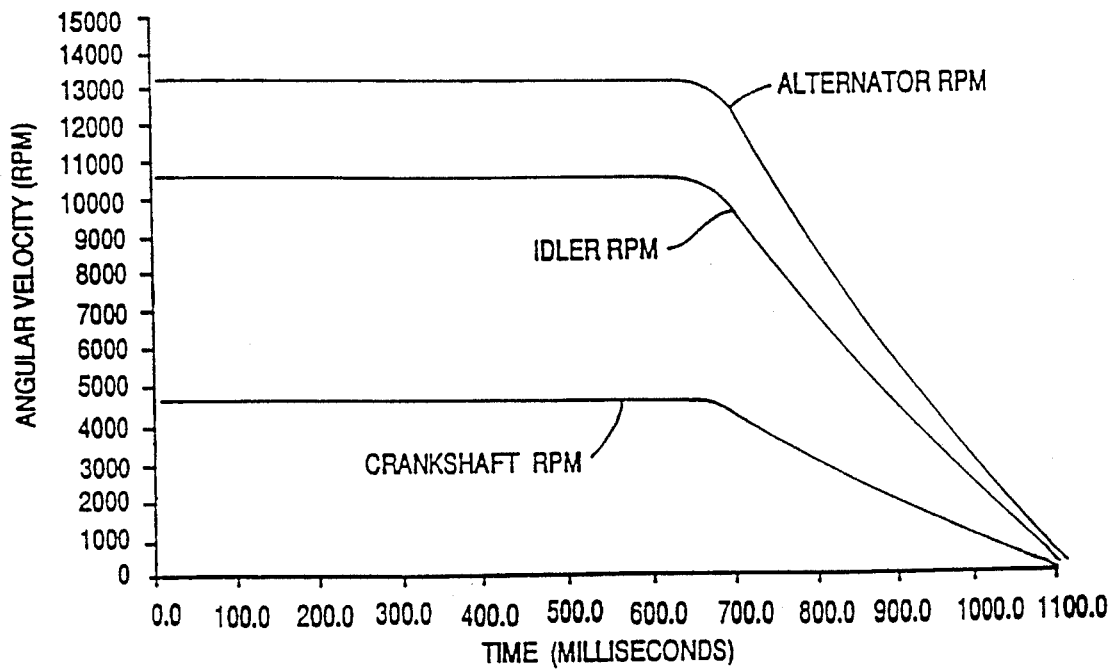

FIGS. 4–5 and 8 illustrate a preferred embodiment of strut 24 according to the present invention, in which the flow of hydraulic fluid to and from cylinder 38 is controlled by a spool valve. FIG. 4 shows strut 24 in the locked condition; FIG. 8 shows strut 24 in the unlocked, or normal condition.

When tensioner arm 20 is moving rotationally at lower speeds, hydraulic oil will be moved by the motion of connecting rod 30 and piston 36 to and from cylinder 38 via passages 84 and 85 as follows. During extension of strut 24, oil will flow from extension end 38B of cylinder 38 and through passage 85 to extension port 92, which is formed in valve body 80. Note that in FIG. 5, two ports 92 are shown, it being understood that the number and size of ports formed in valve body 80 is a tuning feature available to those using a system according to the present invention. Accordingly, the damping produced by strut 24 during normal operation with spool valve 86 in the position shown in FIG. 8, may be set at a range of values from very low to moderate, depending upon the needs of the engine to which the present invention is being applied.

After passing through extension port 92, hydraulic oil flows through the passage defined by annular groove 88 which is located on the cylindrical surface of spool valve 86 and then through compression port 90. Finally, the hydraulic oil flows from compression port 90 into first passage 84 and then into compression end 38A of cylinder 38. Of course, oil is permitted to flow between the compression and extension ends of cylinder 38 only because annular groove 88 is indexed with ports 90 and 92. This indexing is shown in FIG. 8. In the event that tensioner arm 20 and pulley 34 are moved at a high rotational rate of speed in the direction away from drivebelt 12, hydraulic oil at a high pressure will flow from first passage 84 through biasing port 94 and into space 91 above piston end 86A of spool 86. This will push spool 86 downward against the force of spring 96, causing the portion of spool 86 having annular groove 88 to move out of index with ports 90 and 92, thereby causing flow through both ports 90 and 92 to be cut off, with the result that strut 24 will be hydrostatically locked. This hydrostatic lock condition, which is illustrated in FIG. 4, will prevent arm 20 from moving any further in the direction in which the slack in belt 12 is increased.

Those skilled in the art will appreciate that changes and modifications may be made to the invention described herein, while nevertheless coming under the scope of the following claims.

We claim:

1. An accessory drive system for an automotive engine, comprising:

a drive pulley attached to an output shaft of the engine;

a flexible drive belt for connecting the drive pulley with a plurality of driven pulleys, with one driven pulley located upon each of a plurality of driven devices; and a tensioner for maintaining the drive belt in contact with each of said drive and driven pulleys, with said tensioner comprising an arm which is rotatably mounted to the engine and which has a wheel for contacting the drive belt, with the wheel being urged into contact with the drive belt by the arm, and with said tensioner further comprising a hydraulic governor having a sliding valve for hydraulically damping rotational motion of the arm such that at relatively lower rotational speeds of the arm motion of the arm will be damped equally in both directions, but at higher rotational speeds, motion of the arm in the direction away from the drive belt will be resisted by a hydrostatic lock within the governor.

2. An accessory drive system according to claim 1, wherein said hydraulic governor comprises a hydraulic strut interposed between said tensioner arm and a mounting surface fixed to the engine adjacent the tensioner such that linear motion of the strut accompanies rotational motion of the arm, with said strut comprising:

a connecting rod portion having a piston attached thereto, and with said connecting rod having one end attached to said tensioner arm;

a housing having a cylinder bore, with the piston and connecting rod extending slidably within the cylinder;

a valve body mounted in a valve bore within the housing, with a first passage extending from the compression end of the cylinder to the valve bore, and a second passage extending from the extension end of the housing to the valve bore; and a sliding valve mounted for reciprocal motion within the valve body such that motion of the piston and connecting rod at low velocities are equally damped by hydraulic pressure within the cylinder, but motion of the piston and connecting rod at high speeds is resisted by closure of the passage extending from the compression end of the cylinder to the valve bore.

3. An accessory drive system according to claim 2, wherein the sliding valve comprises a spool valve mounted within the valve body such that pressure within the first passage will be applied to a piston end of the spool, so as to urge the spool into a position in which flow between the first and second passages is cut off.

4. An accessory drive system according to claim 3, wherein said spool valve comprises a generally cylindrical body having an annular groove located on its cylindrical surface, with said annular groove indexing with and allowing fluid communication between ports connected with the first and second passages during lower rotational speeds of the arm, with said spool preventing flow between the ports whenever pressure applied to the piston end of the spool exceeds a predetermined value, with the result that the spool is urged to a position in which the annular groove is not indexed with said ports.

5. A tensioner for maintaining an automotive engine accessory drive belt in contact with a plurality of driving and driven pulleys, with said tensioner comprising:

an arm which is rotatably mounted to the engine and which has a wheel for contacting a drive belt, with the wheel being urged into the direction of the drive belt by the arm, and with said tensioner further comprising a hydraulic governor having a sliding valve for hydraulically damping rotational motion of the arm such that at relatively lower rotational speeds of the arm motion of the arm will be damped equally in both directions, but at higher rotational speeds, motion of the arm in the direction away from the drive belt will be resisted by a hydrostatic lock within the governor.

6. A tensioner for maintaining an automotive engine accessory drive belt in contact with a plurality of driving and driven pulleys, with said tensioner comprising:

an arm which is rotatably mounted to the engine and which has a wheel for contacting a drive belt, with the wheel being urged into the direction of the drive belt by the arm, and with said tensioner further comprising a hydraulic governor having a sliding valve for hydraulically damping rotational motion of the arm such that at relatively lower rotational speeds of the arm motion of the arm will be damped equally in both directions, but at higher rotational speeds, motion of the arm in the direction away from the drive belt will be resisted by a hydrostatic lock within the governor, with said hydraulic governor comprising a hydraulic strut interposed between said tensioner arm and a mounting surface fixed to the engine adjacent the tensioner such that linear motion of the strut accompanies rotational motion of the arm, and with said strut comprising:

a connecting rod portion having a piston attached thereto, and with said connecting rod having one end attached to said tensioner arm;

a housing mounted to the engine and having a cylinder bore, with the piston and connecting rod extending slidably within the cylinder;

a valve body mounted in a valve bore within the housing, with a first passage extending from the compression end of the cylinder to the valve bore, and a second passage extending from the extension end of the housing to the valve bore; and a spool valve mounted for reciprocal motion within the valve body such that motion of the piston and connecting rod at low velocities are equally damped, but motion of the piston and connecting rod at high speeds is resisted by closure of the passage extending from the compression end of the cylinder to the valve bore.

7. An accessory drive system according to claim 6, wherein the spool valve is mounted within the valve body such that pressure within the first passage will be applied to a piston end of the spool, so as to urge the spool into a position in which flow between the first and second passages is cut off.

8. An accessory drive system according to claim 7, wherein said spool valve comprises a generally cylindrical body having an annular groove located on its cylindrical surface, with said annular groove indexing with and allowing fluid communication between ports connected with the first and second passages during lower rotational speeds of the arm, with said spool preventing flow between the ports whenever pressure applied to the piston end of the spool exceeds a predetermined value, with the result that the spool is urged to a position in which the annular groove is not indexed with said ports.

* * * * *